(No Model.)
F. C. GILLMORE,
CAR SEAL.
No. 301,113. Patented July 1, 1884.
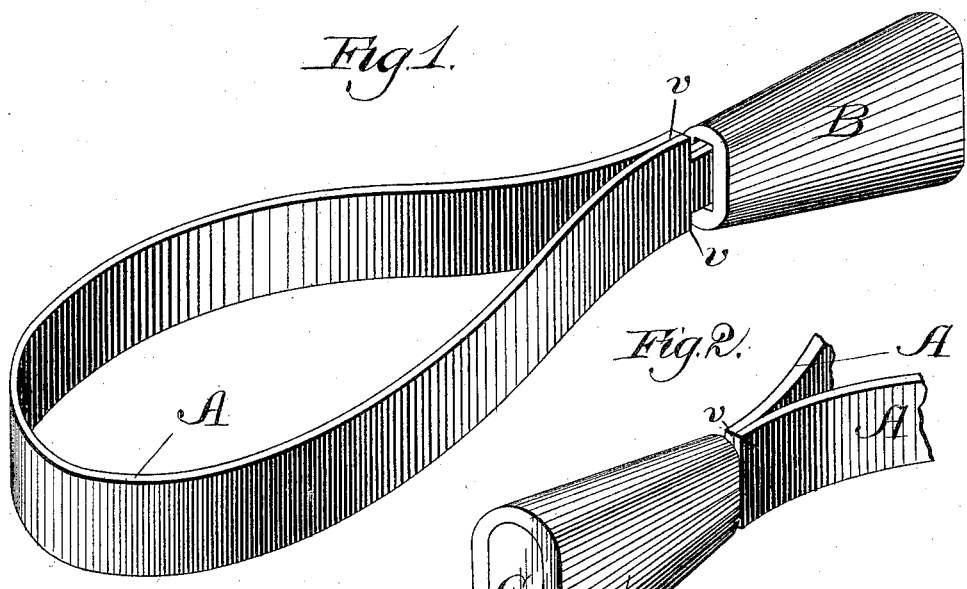
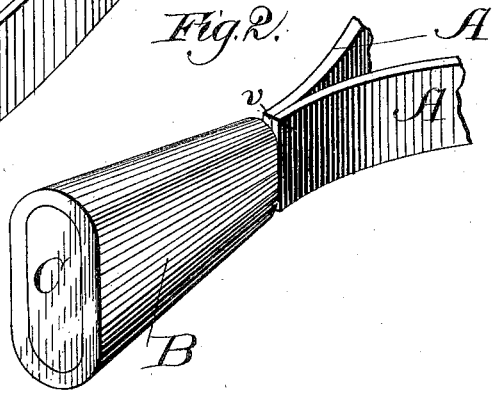
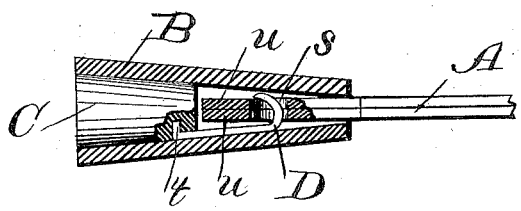
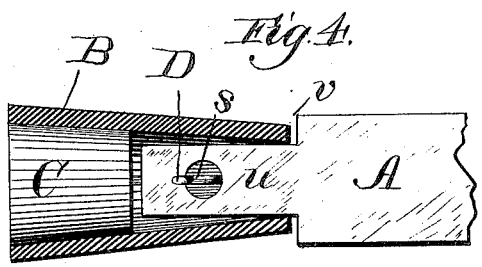
Witnesses:
Chas. E. Gaylord,
Douglas Dyrenforth
Inventor:
Freeman C. Gillmore
by Dyrenforth and Dyrenforth
his Attys.

UNITED STATES PATENT OFFICE.

FREEMAN C. GILLMORE, OF CHICAGO, ILLINOIS.

CAR-SEAL.

SPECIFICATION forming part of Letters Patent No. 301,113, dated July 1, 1884.

Application filed October 31, 1883. (No model.)

*To all whom it may concern:*

Be it known that I, FREEMAN C. GILLMORE, a citizen of the United States, residing at Chicago, in the county of Cook and State of Illinois, have invented certain new and useful inventions in Car-Seals; and I hereby declare the following to be a full, clear, and exact description of the same.

Reference to the present state of the art will show that various devices—some complicated, others simple—have been invented for the purpose of providing a seal for the doors of freight-cars, mail-bags, &c., to operate not as impregnable locks, but as a security against the contents being tampered with, by leaving unmistakable evidence whenever such tampering has occurred. In many of the devices referred to, the object is sought to be accomplished by the use of a strip of frangible metal or wire passing through a staple, which projects through a hasp, the ends of the strip or wire being bent forward toward each other, and secured together in various ways—frequently, when frangible metal is employed, by the use of a lead disk or socket to receive the ends of the strip, which are prevented from withdrawal by stamping or compressing the lead, by means of a hand-punch, into indentations or openings formed near the ends of the strip, or, where wire is used, by twisting the ends thereof and compressing, also by means of a hand-punch, a lead disk upon them.

It is my object to provide a seal that shall be adjustable without the use of a punch of any kind, and which shall be perfectly reliable for effecting the purpose desired; and to this end my invention consists in a self-sealing seal for freight-cars, mail-bags, &c., comprising a strip of metal having an opening provided in each end, and a socket of hard material having a narrow opening at one end for the admission of the ends of the strip, and containing a plug, also of hard material, inserted into the opposite end, and carrying a hook, so arranged as to cause the ends to be caught upon it by means of their openings when slipped into the socket, whereby they are held in position and prevented from withdrawal.

In the drawings, Figure 1 is a perspective view of my improved seal, showing one end of the socket; Fig. 2, a similar view showing the opposite end of the socket; and Figs. 3 and 4, sectional views taken longitudinally through the socket at right angles with each other.

A is a strip of frangible metal provided with a shoulder, $v$, near each extremity, produced in forming the tongues $u$.

B is a socket formed, preferably by casting, of hard metal. The tapering form of the socket shown in the drawings is the one I prefer to adopt, for reasons hereinafter stated, though the shape may be modified without departing from the spirit of my invention. The opening in the socket to receive the tongues $u$ is of dimensions just sufficient to admit them both when laid one upon the other. C is a plug, formed preferably of hard metal, and provided in the casting with a recess to receive the bent end $t$ of the hook D, and with a groove to accommodate part of the shank of the hook.

To adjust my device as a seal, the bent end of a hook having the form shown is inserted into the recess provided in the plug C, and held by the thumb in position until the plug is forced by pressure into the socket B, when the wall of the socket serves to retain the hook in place. The hook D is formed of material that will afford a spring to the hook end, which should be of a length in the socket to reach nearly to the opposite wall. One tongue is slipped into the opening left at one end of the socket B and over the spring end of the hook D, compressing the latter until the opening $s$ in a tongue, $u$, is reached, when the spring end reacts to project through the said opening, whereby the strip is prevented from withdrawal. The opposite end of the strip A, provided with a similar tongue and opening, after being first passed through the hasp on the article to be sealed, is bent around and made to perform the same operation as that just described of the first end; or the strip may be first passed through the hasp, then doubled upon itself, and both ends passed into the socket at the same time, in the manner just described for each. When the device is thus arranged in position as a seal, it cannot be removed except by severing the strip of frangible metal, whereby its purpose as a detector would be accomplished. The plug C is firmly held in position by its frictional contact with the inner walls of the socket B; but additional precaution against its dislodgment by the forcing in of the strip is offered by the shoulders formed on the strip, which abut against the edge of the socket.

As hereinbefore stated, the plug C is preferably formed of hard metal, the objection to soft metal being that it is capable of removal by cutting or gouging with an instrument. Hard rubber, however, may be used, when the hook D could be formed of the same material, and molded as a part of it. Glass is also suitable for the purpose of a plug, and when used a metallic hook, suitably situated, may be secured to it in the molding; or the plug of glass may be provided with a recess and groove, as in the case of the metal plug above described, to receive the bent end and part of the shank of the hook D.

If desired, the socket B may also be formed of glass, when non-frangible metal could be used for the strip, access to the sealed article being gained by fracture of the socket to release the ends of the strip.

The wedge shape of the socket B and plug C is important, as it is thereby rendered impossible to pull the plug through the socket by means of the doubled strip, and the effect of such pulling would be, if the wedge were at all capable of further inward movement, to secure it more firmly within the socket. The hook might likewise be moved to the same extent as the plug; but the effect would only be, owing to the gradually-narrowing dimensions of the socket, to compress the spring end still more upon itself.

What I claim as new, and desire to secure by Letters Patent, is—

1. A self-sealing seal for freight-cars, mail-bags, &c., comprising a strip of metal having an opening at each end, a hollow socket to admit the ends of the said strip at one end of the said socket, a plug to enter and stop up the opposite end thereof, and a hook contained within the socket, to enter into and engage with the openings formed in the ends of the strip and secure the strip against withdrawal, substantially as described, and for the purpose set forth.

2. In a self-sealing seal for freight-cars, mail-bags, &c., the combination of the following elements, viz: a strip of metal, A, having at each end a shoulder, $v$, and tongue $u$, provided with an opening, $s$, a hollow socket, B, of hard material, hook D, and plug C, of hard material, carrying the said hook D, all constructed and arranged to operate substantially as described.

FREEMAN C. GILLMORE.

In presence of—
DOUGLAS DYRENFORTH,
CHARLES C. LINTHICUM.